United States Patent [19]

Onishi et al.

[11] Patent Number: 5,080,508
[45] Date of Patent: Jan. 14, 1992

[54] PLASTIC OPTICAL FIBERS

[75] Inventors: Hiroaki Onishi; Takashi Yamamoto; Katsuhiko Shimada, all of Ohtake, Japan

[73] Assignee: Mitsubishi Rayon Co., Ltd., Tokyo, Japan

[21] Appl. No.: 686,939

[22] Filed: Apr. 18, 1991

[30] Foreign Application Priority Data

Apr. 19, 1990 [JP] Japan .................. 2-101809

[51] Int. Cl.$^5$ ................... G02B 1/04; G02B 6/16
[52] U.S. Cl. .................. 385/143; 385/145; 526/247; 549/455
[58] Field of Search .............. 350/96.29, 96.30, 96.31, 350/96.33, 96.34; 526/247; 549/455

[56] References Cited

U.S. PATENT DOCUMENTS

| | | | |
|---|---|---|---|
| 3,865,845 | 2/1975 | Resnick | 549/455 |
| 3,978,030 | 8/1976 | Resnick | 526/247 |
| 4,946,902 | 8/1990 | Bekiarian et al. | 525/326.2 |
| 4,966,435 | 10/1990 | Matsumoto et al. | 350/96.34 |

*Primary Examiner*—John D. Lee
*Attorney, Agent, or Firm*—Finnegan, Henderson, Farabow, Garrett & Dunner

[57] ABSTRACT

A plastic optical fiber comprising a fluorine-containing core polymer consisting essentially of 1) a group (A) of repeating units having a cyclic structure represented by general formula (I) and/or general formula (II); or 2) the group (A) above and group (B) of repeating units represented by general formula (III) wherein the content of the group (A) in the core polymer is at least 80 wt %; and a clad copolymer of perfluoro(2,2-dimethyl-1,3-dioxole) and at least one other ethylenically unsaturated monomer having a refractive index below that of the core polymer.

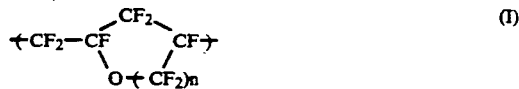

(I)

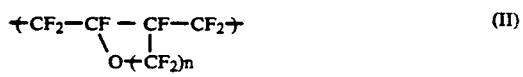

(II)

(wherein n is 1 or 2)

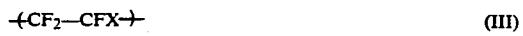

(III)

(wherein X is F, Cl, O—CF$_2$CF$_2$CF$_3$, O—CF$_2$CF(CF$_3$)OCF$_2$CF$_2$SO$_2$F, or O—CF$_2$CF$_2$CF$_2$COOCH$_3$)

This plastic optical fiber has heat-resistance and very few water-absorbing properties, and can transmit not only visible rays but also rays having wavelengths in the near infrared region.

5 Claims, No Drawings

PLASTIC OPTICAL FIBERS

BACKGROUND OF THE INVENTION

1. Field of the Invention

The present invention relates to a plastic optical fiber that can transmit light having wavelengths not only in the visible ray region, but also in the near infrared region, and that is heat-resistant. More specifically, the present invention relates to a plastic optical fiber that can be used as in optical fiber code and an optical fiber cable.

2. Description of the Related Art

Inorganic glass optical fibers have been known as optical fibers that are excellent in light transmission properties over a broad range of wavelengths. However, since they do not have good processability or flexural strength, plastic optical fibers were developed and have been widely used as optical fibers.

These plastic optical fibers are basically comprised of a core polymer made of a polymer that has excellent light transmission properties and a high refractive index, such as polymethylmethacrylate (hereinafter referred to as PMMA), polycarbonate (hereinafter referred to as PC), and a clad polymer made of a transparent polymer that has a refractive index below that of the core polymer, such as a fluorine-containing polymer.

Known examples of the plastic optical fibers of this type are optical fiber strands, bulk fibers made by covering optical fiber strands with a functional protective layer, optical fiber codes made by covering the optical fiber strands with a jacket, bundle fibers made of an assembly of the bulk fibers, and optical fiber cables made by applying tension members to the bulk fibers.

These plastic optical fibers, however, have many C—H bonds in the core polymer, and light absorption based on the expansion and contraction, or vibration of the C—H bonds, appears in the short wavelength regions Five to eight times the harmonic absorption also appears in the near infrared to visible ray region, namely, at a wavelength of not less than 400 nm. The light transmission losses in these regions are serious. For example, the transmission loss of an optical fiber comprising a core polymer of PMMA is about 100 dB/Km at a wavelength of 650 nm, and about 400 dB/Km at a wavelength of 780 nm. To avoid the transmission losses based on the C—H bonds in the core polymer, a core polymer comprising $d_8$-PMMA, of which all the H atoms in the PMMA are replaced by D atoms, was proposed. This optical fiber containing $d_8$-PMMA as a core polymer has a transmission loss of 50 dB/Km at a wavelength of 780 nm. Deutrated PMMA, however, has high water-absorbing properties, and over time the $d_8$-PMMA core polymer absorbs water, and the transmission loss will increase over time. Thus, this optical fiber cannot be used as an optical fiber that is expected to have a high reliability over a long period.

Since LEDs that can emit rays in the near infrared region, and that have high power, and that can be used for high-speed data transmission, have been produced in large quantities at low cost, a plastic optical fiber that can effectively transmit rays in the near infrared region has been desired to be developed.

SUMMARY OF THE INVENTION

An object of the present invention is to provide a plastic optical fiber that is excellent in the transmission of light in the near infrared region.

Another object of the present invention is to provide a plastic optical fiber that can effectively transmit light in the near infrared region and that is suitable for practical use.

Recently, a unique fluorine-containing resinous polymer (1) consisting essentially of a group (A) of repeating units having a cyclic structure represented by formula (I) and/or formula (II), or a unique fluorine-containing resinous polymer (2) consisting essentially of the group (A) above and a group (B) of a repeating unit represented by formula (III) wherein the content of the group (A) in the polymer (2) is at least 80 wt %, was disclosed in Japanese Laid-open Publication No. Hei 1-131215.

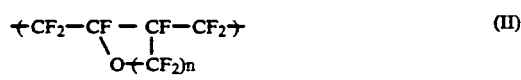

(wherein n is 1 or 2)

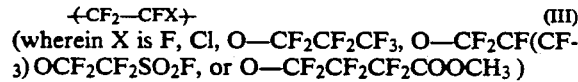

(wherein X is F, Cl, O—CF$_2$CF$_2$CF$_3$, O—CF$_2$CF(CF$_3$)OCF$_2$CF$_2$SO$_2$F, or O—CF$_2$CF$_2$CF$_2$COOCH$_3$ )

This Publication states that this fluorine-containing resinous polymer (1) or polymer (2) is clear and transparent, and excellent in the transmission of UV and IR rays. It also states that this resinous polymer has a low refractive index, and can be used as a clad polymer of an optical fiber.

To attain the above objects, the present inventors have conducted research and have found that the above unique fluorine-containing polymer can be used as a core polymer of a plastic optical fiber, and that a heretofore desired plastic optical fiber can be obtained by using a copolymer of perfluoro(2,2-dimethyl-1, 3-dioxole) and at least one other ethylenically unsaturated monomer that has a refractive index sufficiently below that of the core polymer, as a clad polymer.

Heretofore conventional plastic optical fibers have been developed that are composed of a core polymer having many C—H bonds in a molecule, and thus light transmission loss is a serious problem. In contrast, the core polymer used in the present invention can decrease the number of C—H bonds in a monomer unit by using an alkyl group containing many fluorine atoms constituting the ether group in the monomer unit. Thus it can eliminate extreme light absorption losses caused by the expansion and contraction, or vibration, of the C—H bonds. Further, the core polymer used in the present invention has very few water-absorbing properties, because of the many fluorine atoms it contains, and thus the optical fiber of the present invention that is composed of this core polymer can decrease light absorption loss caused by the water absorption of the core polymer.

It has been admitted in the art that it becomes very difficult to choose a proper clad material, if a polymer having a low refractive index, such as the core polymer used in the present invention, is used as a core polymer. In this difficult situation, the present inventors have found that a clad copolymer comprising perfluoro(2,2-dimethyl-1,3-dioxole) as a main monomer, such as a copolymer of perfluoro(2,2-dimethyl-1,3-dioxole) and at least one other ethylenically unsaturated monomer, has a transparency and a refractive index sufficiently below that of the core polymer. This finding of this novel combination of a core polymer and a clad polymer has matured into the present invention.

DESCRIPTION OF THE PREFERRED EMBODIMENTS

The core polymer used in the present invention is a fluorine-containing resinous polymer (1) consisting essentially of the group (A) of repeating units having a cyclic structure represented by formula (I) and/or formula (II), or a fluorine-containing resinous polymer (2) consisting essentially of the group (A) above and the group (B) of repeating units represented by formula (III) wherein the content of the group (A) in the polymer (2) is at least 80 wt %.

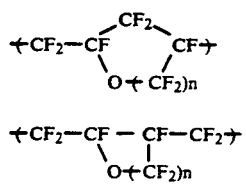

(wherein n is 1 or 2)

$$\text{-(CF}_2\text{-CFX)-} \quad \text{(III)}$$

(wherein X is F, Cl, O—CF$_2$CFhd 2CF$_3$, O—CF$_2$CF(CF$_3$)OCF$_2$CF$_2$SO$_2$F, or O—CF$_2$CF$_2$CF$_2$COOCH$_3$ )

These polymers (1) and (2) can be obtained by, for example, the processes disclosed in Japanese Laid-open Publication No. Hei 1-131215.

Among the repeating units constituting the group (A), those derived from perfluoroallylvinylether (hereinafter referred to as PAVE), and perfluorobutenylvinylether (hereinafter referred to as PBVE) which are represented by general formula (IV), are most preferable.

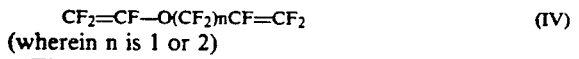

(wherein n is 1 or 2)

The group (A) of the repeating units of formula (I) and/or formula (II) is preferably obtained by conducting a cyclic polymerization of fluorovinylether represented by formula (IV), such as PAVE or PBVE, with a radical catalyst. If PAVE is used, the repeating units represented by formula (I) and/or formula (II) (wherein n is 1) are obtained. If PBVE is used, the repeating units represented by formula (I) and/or formula (II) (wherein n is 2) are obtained. PAVE and PBVE can be copolymerized in any ratio, and thus a copolymer containing the repeating units (wherein n=1) and those (wherein n=2) in any ratio can be obtained.

In the polymer (2), the content of the group (A) should preferably be at least 80wt% to obtain a polymer that can be used as a core polymer. If the content is below this value, the transparency, solution-solubility, and strength of the polymer (2), become insufficient The preferable clad copolymer to be used in the present invention is a copolymer of perfluoro(2,2-dimethyl-1 3-dioxole) and at least one other ethylenically unsaturated monomer. The perfluoro(2,2-dimethyl-1,3-dioxole) can be prepared by, for example, the method disclosed in U.S. Pat. No. 3,865,845, and its copolymer with the unsaturated monomer can be prepared by, for example, the method disclosed in U.S. Pat. No. 3,978,030.

Examples of the ethylenically unsaturated monomer include ethylene, propylene, isobutylene, 1-butene, methylvinylether, ethylvinylether, propylvinylether, butylvinylether, CF$_2$=CF$_2$, CHF=CF$_2$, CH$_2$=CF$_2$, CH$_2$=CHF, CClF=CF$_2$, CHCl=CF$_2$, CCl$_2$=CF$_2$, CClF=CClF, CHF=CCl$_2$, CH$_2$=CClF, CCl$_2$=CClF, fluoropropylene compounds such as CF$_3$CF=CF$_2$ and CF$_3$CF=CHF, and monomers having functional groups such as perfluoro(alkylvinylether), methyl-3-[1-[difluoro[(trifluoroethenyl)oxy]methyl]-1,2,2,2-tetrafluoroethoxy]-2,2,3,3-tetrafluoropropanoat e, and 2-{1-[difluoro[(trifluoroethenyl)oxy]methyl]-1,2,2,2-tetrafluoroethoxy}-1,1,2,2tetrafluoroethanesulfo nylfluoride.

Since this clad polymer is amorphous and highly transparent, and has a low refractive index in the range of from 1.29 to 1.35, it can be suitably used as a clad polymer in this invention. To prepare a clad copolymer having a refractive index in this range, the content of perfluoro[2,2-dimethyl-1,3-dioxole]unit in the clad polymer should be in the range of not less than 20 mole % to 100 mole %, preferably in the range of 25.0 to 99.7 mole %.

The plastic optical fiber obtained by combining the core polymer with the clad polymer does not contain many C—H bonds per molecule in the core polymer, and its water absorption is as small as 1/10 of a PMMA-type optical fiber. Thus, no increase in transmission loss over time caused by water absorption is observed, and the transmission loss is small not only in the visible ray region (400~800 nm), but also in the near infrared ray region (800~1300 nm).

In addition to this feature, the optical fiber of the present invention can provide an optical fiber having a large numerical aperture, since it is comprised of the core polymer having a refractive index of 1.33 to 1.46, and a clad polymer having a refractive index of 1.29 to 1.35.

The present invention will now be described in more detail by reference to the following examples and comparative examples:

EXAMPLE 1

A polymer (Tg 108° C. ; Refractive Index 1.342) derived from PBVE was fed into the core polymer feeding portion in a spinning machine maintained at 210° C.

A clad copolymer (Refractive Index 1.308) of 50 mole % of perfluoro(2,2- dimethyl-1,3-dioxole) and 50 mole % of tetrafluoroethylene was melted with a melt extruder, and was fed into the clad material feeding portion in the spinning machine The fed core and clad polymers were spun through a conjugate spinning nozzle to give an optical fiber having a core-clad structure and an outer diameter of 1 mm$\phi$ . The light transmission loss of the thus-produced optical fiber was very small (96 dB/Km at a wavelength of 650 nm; 368 dB/Km at a wavelength of 770 nm; 826 dB/km at a wavelength of 950 nm). The thus-prepared optical fiber was kept for 24 hours under a wet-heat condition of 50° C. and 95% RH. The light transmission loss of this optical fiber was 386 dB/Km at a wavelength of 770 nm, and the increase in the transmission loss over time was very small.

EXAMPLE 2

An optical fiber was prepared by using the same method as that in Example 1, except that a copolymer (Refractive Index 1.347) made of 95 wt % of PBVE and 5 wt % of tetrafluoroethylene was used as the core polymer. The light transmission losses of the thus-prepared optical fiber were as given in Table 1.

EXAMPLE 3

An optical fiber was prepared by using the same method as in Example 1, except that a copolymer (Tg 91° C.; Refractive Index 1.343) of 50 wt % of PBVE and 50 wt % of PAVE was used as the core polymer.

The light transmission losses of the thus-prepared optical fiber were as given in Table 1.

EXAMPLE 4

An optical fiber was prepared by using the same method as that in Example 1, except that a copolymer (Refractive Index 1.371) of 80 wt % of PBVE and 20 wt % of chlorotrifluoroethylene was used as the core polymer.

The light transmission losses of the thus-prepared optical fiber were as given in Table 1.

COMPARATIVE EXAMPLE 1

An optical fiber was prepared by using the same method as in Example 1, except that PMMA and a copolymer of 50 mole % of perfluoro(2,2-dimethyl-1,3-dioxole) and 50 mole % of tetrafluoroethylene were used as the core polymer and the clad polymer, respectively.

As shown in Table 1, the transmission loss in the near infrared region was large, and the loss greatly increased after the optical fiber was subjected to a wet-heat atmosphere of 50° C. and 95% RH.

COMPARATIVE EXAMPLE 2

An optical fiber was prepared by using the same method as that in Example 1, except that $d_8$-PMMA and a copolymer of 50 mole % of perfluoro(2,2-dimethyl-1,3-dioxole) and 50 mole % of tetrafluoroethylene were used as the core polymer and the clad polymer, respectively.

As shown in Table 1, the initial transmission loss was small, but the transmission loss increased very greatly after the optical fiber was subjected to the wet-heat atmosphere.

Having now fully described the present invention, it will be apparent to one skilled in the art that many changes and modifications can be made thereto without departing from the spirit or scope of the present invention stated above.

TABLE 1

| | Composition in the Core Polymer (Refractive Index) | Composition in the Clad Polymer (Refractive Index) | Transmission Loss (dB/Km) 650 nm | 770 nm | 950 nm | Transmission Loss in a wet-heat atmosphere (dB/Km) 770 nm |
|---|---|---|---|---|---|---|
| Ex. 2 | perfluorobutenylvinylether tetrafluoroethylene (1.347) | perfluoro(2,2-dimethyl-1,3-dioxole) 50 mole % tetrafluoroethylene 50 mole % (1.308) | 73 | 284 | 621 | 298 |
| Ex. 3 | perfluorobutenylvinylether perfluoroallylvinylether (1.343) | same as above | 104 | 302 | 531 | 331 |
| Ex. 4 | perfluorobutenylvinylether chlorotrifluoroethylene (1.371) | same as above | 112 | 413 | 893 | 425 |
| Comp. Ex. 1 | methylmethacrylate 100 mole % (1.492) | perfluoro(2,2-dimethyl-1,3-dioxole) 50 mole % tetrafluoroethylene 50 mole % | 117 | 421 | 2360 | 840 |
| Comp. Ex. 2 | deutrated methylmethacrylate 100 mole % (1.492) | same as above | 65 | 68 | 2300 | 520 |

What is claimed is:

1. A plastic optical fiber comprising,
   a fluorine-containing core polymer consisting essentially of group (A) of repeating units having a cyclic structure represented by general formula (I) and/or general formula (II), and
   a clad copolymer of perfluoro (2,2-dimethyl-1,3-dioxole) and at least one other ethylenically unsaturated monomer having a refractive index below that of the core polymer.

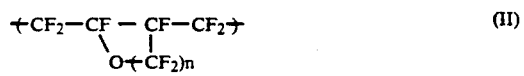

(wherein n is 1 or 2).

2. The plastic optical fiber as defined in claim 1, wherein the group (A) is derived from at least one of perfluroallylvinylether and perfluorobutenylvinylether.

3. A plastic optical fiber comprising,
   a fluorine-containing core polymer consisting essentially of group (A) of repeating units having a cyclic structure represented by general formula (I) and/or general formula (II) and group (B) of repeating unit represented by general formula (III) wherein the content of the group (A) in the core polymer is at least 80 wt %, and
   a clad copolymer of perfluoro (2,2-dimethyl-1,3-dioxole) and at least one other ethylenically unsaturated monomer having a refractive index below that of the core polymer.

-continued

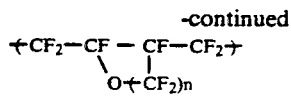

(wherein n is 1 or 2)

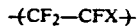

(wherein X is F, Cl, O—$CF_2CF_2CF_3$, O—$CF_2CF(CF_3)OCF_2CF_2SO_2F$, or O—$CF_2CF_2CF_2COOCH_3$).

4. The plastic optical fiber as defined in claim 3, wherein the group (A) is derived from at least one of perfluoroallylvinylether and perfluorobutenylvinylether.

5. The plastic optical fiber as defined in claim 3 or 4, wherein the group (B) is derived from a comonomer represented by general formula (IV).

(wherein X is F, Cl, O—$CF_2CF_2CF_3$, O—$CF_2CF(CF_3)OCF_2CF_2SO_2F$, or O—$CF_2CF_2CF_2COOCH_3$).

* * * * *